(12) United States Patent
Cornell et al.

(10) Patent No.: US 7,316,475 B2
(45) Date of Patent: Jan. 8, 2008

(54) THERMAL PRINTING OF SILVER INK

(76) Inventors: Robert Wilson Cornell, 4173 Palmetto Dr., Lexington, KY (US) 40513; Jamee Casteel Holiway, 64 Weissinger Ct., Shelbyville, KY (US) 40065; Ann P. Holloway, 1136 Chetford Dr., Lexington, KY (US) 40509

(*) Notice: Subject to any disclaimer, the term of this patent is extended or adjusted under 35 U.S.C. 154(b) by 255 days.

(21) Appl. No.: 10/985,708

(22) Filed: Nov. 10, 2004

(65) Prior Publication Data
US 2006/0098069 A1 May 11, 2006

(51) Int. Cl.
*B41J 2/01* (2006.01)
*G01D 11/00* (2006.01)

(52) U.S. Cl. ................ 347/101; 347/100; 347/95
(58) Field of Classification Search ........ 347/100, 347/95, 96, 62, 63, 64, 101; 428/195, 32.1; 523/160; 106/31.27, 31.13, 31.6
See application file for complete search history.

(56) References Cited

U.S. PATENT DOCUMENTS

| | | | |
|---|---|---|---|
| 2,866,764 A * | 12/1958 | West et al. ........ 428/195.1 |
| 3,305,369 A | 2/1967 | Cuhra et al. |
| 4,668,533 A | 5/1987 | Miller |
| 4,762,732 A | 8/1988 | Drake et al. |
| 5,132,248 A | 7/1992 | Drummond et al. |
| 5,658,499 A | 8/1997 | Steinberg et al. |
| 5,763,058 A * | 6/1998 | Isen et al. .......... 428/209 |
| 6,132,030 A | 10/2000 | Cornell |
| 6,331,204 B1 * | 12/2001 | Carr et al. ......... 106/31.27 |
| 6,575,563 B1 | 6/2003 | Cornell |
| 2003/0185971 A1 | 10/2003 | Saksa et al. |
| 2004/0021740 A1 | 2/2004 | Bell et al. |

OTHER PUBLICATIONS

Robert W. Cornell, A Theoretical and Experimental Examination of Thermal Ink Jet Nucleation Criteria, paper delivered, IS&T-NIP1Z, Int. Conf. Digital Printing Tech., Recent Progress in Ink Jet Technologies II, Chapter, 2, Thermal Ink Jet, 1996, pp. 108-113.

* cited by examiner

*Primary Examiner*—Manish S. Shah

(57) ABSTRACT

Aqueous inkjet inks having metal nanoparticles for printing of conductive patterns or for other reasons can be printed employing heat energy within the range of current printers. For optimum printing the energy delivered would be about $2.9 \times 10^9$ Joules/m$^3$ or larger of volume of the heater stack, preferably not much larger so as to conserve energy. In embodiments the mole fraction of water in the ink would be greater than 0.9 computed with respect to only the liquid components of the ink and the ink would be heated by contact with the surface a heater heated to $1.5 \times 10^{15}$ or more watts/m$^3$ of volume of the heater stack. Embodiments of a silver ink will have greater than 12% silver and up to 27% silver by weight of the weight of the ink; the ink may have a viscosity of less than 3 Pa-s at 22 degrees C., preferably is less than 2.7 mPa-s; the ink may have a mole fraction of water greater than 0.87, preferably greater than 0.9, this mole fraction being computed with respect to all of the components of the ink.

12 Claims, 6 Drawing Sheets

THERMAL PRINTING OF SILVER INK

TECHNICAL FIELD

This invention relates to a method for thermal printing conductive inkjet inks that are heavily loaded (up to 27 wt. %) with silver particles.

BACKGROUND OF THE INVENTION

It will be shown that the nucleation kinetics of silver loaded inks is identical to that of deionized water. The nucleation response of the silver-loaded inks described in this patent specification is also indistinguishable from aqueous inks formulated with dye and pigment colorants. It will be further shown that the nucleation kinetics of all the aforementioned liquids can be described as a function of heater power per unit volume.

Thus the results are applicable to any heater size, shape, thin film stack, or print head manufacturer. The discovery that heavily loaded conductive silver inks have the same nucleation kinetics as common water and ordinary reflection print inks was unexpected.

Another unexpected discovery was that inks heavily loaded with silver have low viscosity. With up to 27 wt. % of the liquid consisting of solid metal particles, it was surprising to see that the conductive inks had viscosity values between 2.25 and 2.72 mPa-s. In other words, heavily loaded silver inks can be formulated to attain viscosity values on par with typical thermal inkjet inks.

With regards to nucleation kinetics, two applicable prior art patents are U.S. Pat. No. 6,132,030 issued Oct. 17, 2000, to Robert W. Cornell, as inventor of this application, and U.S. Pat. No 6,575,563 issued Jun. 120, 2003, also to Robert W. Cornell. The U.S. Pat. No. 6,132,030 describes a method of printing with a thermal inkjet printhead whereby the power per unit heater area is greater than 2 gigawatts per square meter. The U.S. Pat. No. 6,575,563 extends the teachings to include various thin film materials and thickness values. It describes the advantages of maintaining the heater-stack power per unit volume to values greater than $1.5 \times 10^{15}$ Watts per cubic meter. Both of these patents were based upon laboratory experiments involving traditional dye and pigment colorant inks, i.e. aqueous inks that were designed for reflection print metrics like gamut, optical density and light fastness, not electrical conductivity.

DISCLOSURE OF THE INVENTION

This invention employs the foregoing high energy levels for inkjet printing of aqueous inks heavily loaded with silver nanoparticles. The particle size (diameter) of the silver would typically be less than 50 nanometers (nm) for the best resolution and minimal settling. Particle sizes of the order of magnitude of 25 nm (i.e., between about 20 to 30 nm) would be generally preferred for the same reasons. An upper limit to prevent excess settling is about 132 nm. The silver would normally be associated with an organic dispersant, having an affinity for the material being dispersed, silver and an affinity for water, as is conventional.

Thermal inkjet printing to which this invention relates is now widely practiced. It involves the intense heating of an aqueous ink in a small amount in contact with a heating element so that the ink is vaporized. The vaporized ink, including solids in the ink, is expelled through a nozzle and thereby directed to an intended substrate.

The discovery that inks heavily loaded with silver particles nucleate vapor bubbles just like water was unexpected. It was also unexpected that inks heavily loaded with silver particles would have low viscosity. While the novelty of this invention pertains to these unexpected laboratory discoveries, the disclosure will go on to discuss the theoretical basis for the discoveries. These discoveries could not have been anticipated during the time frame of the cited prior art. Only after the new discoveries were made, and the quest for a theoretical explanation was completed, could we teach this improvement to the body of knowledge.

BRIEF DESCRIPTION OF THE DRAWINGS

The details of this invention will be described in connection with the accompanying drawings in which.

DESCRIPTION OF THE PREFERRED EMBODIMENTS

Section-I: Viscosity Effects

Figure 1:
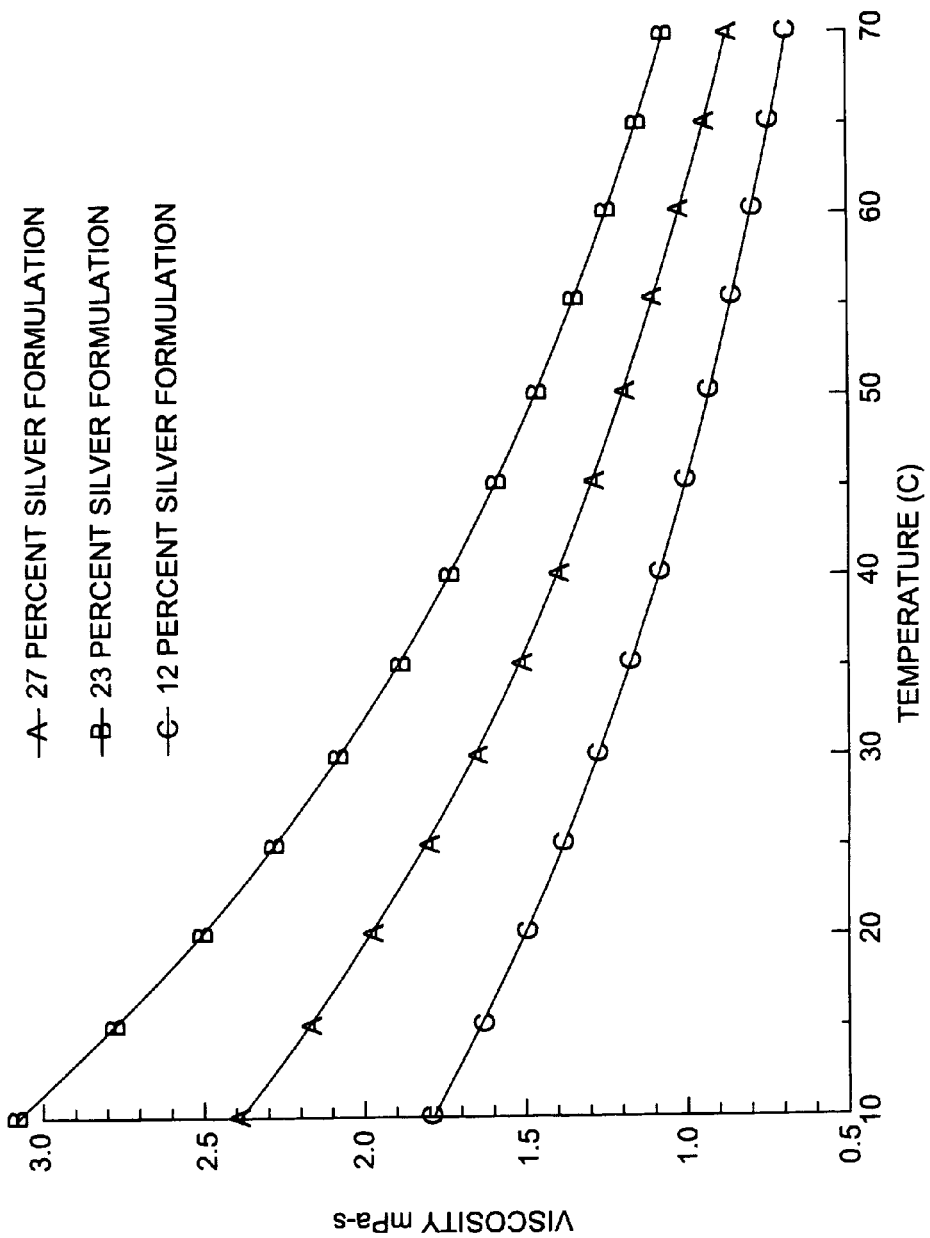
FIG. 1 is a plot of temperature versus viscosity of values based on the experimental data of Tables 1-4 and calculations as described.

First, a discussion on the viscosity effects of inks heavily loaded with solid, electrically conductive particles. The viscosity of two conductive ink formulations were measured (23 and 27 wt. % silver). The viscosity of the 23% silver formulation was 2.62-2.72 mPa-s at normal lab temperature (approx. 22 C). The 27% formulation was even lower—2.25 mPa-s.

Initially, it was thought that the measurements were in error because how could inks with such heavy solid loading have such low viscosity; and furthermore, how could the ink with the highest solid loading have the lowest viscosity? Both of these questions can be addressed with a theoretical examination of the formulations. The formulations are shown in Tables 1-3.

These tests were made using a silver paste (a wet but primarily of solids silver dispersion, having some dispersant). The particles were shown as less than about 50 nm in diameter (a particle size less than about 50 nm). An equivalent silver paste in accordance with this invention may be made in accordance with U.S. patent application Ser. No. 10/925,042; filed Aug. 24, 2004, the technical description of which appears in this specification under the heading Addendum, Paste Technical Description after the technical description of the invention of this application.

Tables 1-3 merely show silver for the silver paste as the details of the dispersant are uncertain, except that it is an organic polymer, but the amount of dispersant is not significant as the formulas of Tables 1-3 include an insignificant amount of an organic polymer (the resin), which is a binder to hold the particles printed, as is conventional of pigment inks.

The 12% silver formulation is listed, but not enough ink was made to measure viscosity. However, it was tested for nucleation response. That topic will be covered in Section-II.

TABLE 1

12% Silver Formulation (μ not measured)

| Component | Molecular Weight (Specific Volume cm³/g) | Weight % | Moles |
|---|---|---|---|
| Silver | 107.87 (0.0953) | 12 | 0.1112 |
| Glycerol | 92.09 (0.794) | 8 | 0.0869 |
| 2-Pyrrolidone | 85.11 (0.903) | 10 | 0.1175 |
| SURFYNOL 465 | 826 | 0.5 | 0.0006 |
| Resin | Unknown | 0.64 | Negligible |
| Water | 18 (1.0) | 68.86 | 3.8256 |

TABLE 2

23% Silver Formulation (μ ~ 2.62–2.72 mPa-s)

| Component | Molecular Weight (Specific Volume cm³/g) | Weight % | Moles |
|---|---|---|---|
| Silver | 107.87 (0.0953) | 23 | 0.21322 |
| Glycerol | 92.09 (0.794) | 10 | 0.10859 |
| 2-Pyrrolidone | 85.11 (0.903) | 10 | 0.1175 |
| SURFYNOL 465 | 826 | 0.5 | 0.0006 |
| Resin | Unknown | 1.53 | negligible |
| Water | 18 (1.0) | 54.96 | 3.05311 |

TABLE 3

27% Silver Formulation (μ ~ 2.25 mPa-s)

| Component | Molecular Weight (Specific Volume cm³/g) | Weight % | Moles |
|---|---|---|---|
| Silver | 107.87 (0.0953) | 27 | 0.2503 |
| Glycerol | 92.09 (0.794) | 4.5 | 0.0489 |
| 2-Pyrrolidone | 85.11 (0.903) | 4.5 | 0.0529 |
| SURFYNOL 465 | 826 | 0.5 | 0.0006 |
| Resin | Unknown | 1.8 | negligible |
| Water | 18 (1.0) | 61.7 | 3.4278 |

While kinetic theory and corresponding states methods may predict the viscosity of gaseous mixtures, no comparable theoretical basis exists for liquid mixtures. For this reason, it is best to use experimental data for the viscosity of liquid mixtures. However, it is also desirable to be able to estimate the liquid viscosity to offer explanations for empirical oddities—like the unexpected low viscosity values for heavily loaded silver inks. It will be shown that the viscosity results are explained by a novel combination of the method of Teja-Rice (Steps 2-6,8), along with the Ambrose-Walton Corresponding States Method (Step 1), the Lewis-Squires equation (Step 7) and the Einstein equation (Step 10).

Note: the Xi mole fractions referred to in Steps 1-8 are the liquid mole fractions, i.e. the silver component is removed from the mixture during these steps. The effect of the solid particles on the mixture viscosity will be accounted for in Steps 9-10. Also, because the molar constituents of the liquid are primarily water, glycerol and 2-pyrolidone, only those components are considered in the calculations.

The property values for the primary liquid constituents are shown in Table 4. These property values will be used in the viscosity calculations.

TABLE 4

Properties of the Primary Liquid Components

| Property | Water | Glycerol | 2-Pyrrolidone |
|---|---|---|---|
| Normal Boiling Point Tb(K) | 373 | 563 | 525 |
| Critical Temperature Tc(K) | 647 | 765 | 796 |
| Critical Pressure Pc(bar) | 221 | 43 | 62 |
| Critical Volume Vc(cm³/mol) | 56 | 255 | 268 |
| Molecular Weight (g/mol) | 18 | 92 | 85 |
| Ref Temperature $T_K$ (C.) | 293 | 298 | 298 |
| Viscosity (mPa-s) at $T_K$ | 1.0 | 934 | 13.3 |

Estimate the Viscosity of the Liquid-solid Mixture

Step 1: Use the Ambrose-Walton Equation the determine the acentric factor for each of the liquid components (the acentric factor is a commonly used thermodynamic constant that is related to the critical compressibility factor (Zc) of a pure component):

$$\omega_i = -\frac{\text{Ln}(Pc/1.01325) + f_0}{f_1} \quad \text{Eq. [1]}$$

$$f_0 = \frac{-5.97616\tau + 1.29874\tau^{1.5} - 0.60394\tau^{2.5} - 1.06841\tau^5}{(Tb/Tc)}$$

$$f_1 = \frac{-5.03365\tau + 1.11505\tau^{1.5} - 5.41217\tau^{2.5} - 7.46628\tau^5}{(Tb/Tc)}$$

$$\tau = 1 - \frac{Tb}{Tc}$$

$\omega_i$ = acentric factor for each liquid component
Pc = critical pressure for each liquid component (bar); [1 bar=100,000 Pa]
Tb = normal boiling temperature for each liquid component (K)
Tc = critical temperature for each liquid component (K)

Step 2: Compute the acentric factor of the liquid mixture:

$$\omega_M = \sum_{i=1}^{N} X_i \omega_i \quad \text{Eq.[2]}$$

$\omega_M$ = acentric factor of the liquid mixture
Xi = mole fraction of each liquid component
N = number of liquid components in the mixture Step 3: Compute Vcm:

$$Vcm = \sum_i \sum_j X_i X_j Vc_{ij} \quad \text{Eq. [3]}$$

$$Vc_{ij} = \frac{(Vc_i^{1/3} + Vc_j^{1/3})^3}{8}$$

Xi = mole fraction of liquid component i
Xj = mole fraction of liquid component j
Vci = critical volume of liquid component i
Vcj = critical volume of liquid component j
i = 1,2,3 . . . N
j = 1,2,3 . . . N Step 4: Compute Tcm:

$$Tcm = \frac{\sum_i \sum_j X_i X_j \Gamma_{ij}}{Vcm} \qquad \text{Eq. [4]}$$

$$\Gamma_{ij} = \psi_{ij}(Tc_i Tc_j Vc_i Vc_j)^{1/2}$$

Tci=critical temperature of liquid component i
Tcj=critical temperature of liquid component j
$\psi_{ij}$=interaction parameter ~1.5
$\psi_{ij}$=1.0 for i=j
Step 5: Compute Mm:

$$M_m = \sum_i X_i M_i \qquad \text{Eq.[5]}$$

Mi=Molecular Weight of Liquid Component i
Step 6: Compute $\epsilon_i$ for each component and $\epsilon_m$ for the liquid mixture:

$$\varepsilon_i = \frac{Vc_i^{2/3}}{\sqrt{Tc_i M_i}} \qquad \text{Eq.[6]}$$

$$\varepsilon_m = \frac{Vcm^{2/3}}{\sqrt{(Tcm)(Mm)}}$$

Step 7: Choose 2 of the components as reference liquids. Using a known (viscosity, temperature) point for each reference liquid, use the Lewis-Squires equation to estimate the viscosity of both reference liquids for temperatures over the range of interest (10-70 C):

$$\mu_R = \left[\mu_K^{-0.2661} + \frac{T - T_K}{233}\right]^{-3.758} \qquad \text{Eq.[7]}$$

$\mu_R$=viscosity of reference liquid R over temperature range T; (R=1,2)
$\mu_K$=known viscosity (mPa-s) of reference liquid R at temperature $T_K$ (C)

T=10, 15, 20 . . . 70 C

Step 8: Use the Teja-Rice equation to estimate the viscosity of the liquid mixture $\mu_m$ over temperature range T:

$$\text{Ln}(\mu_m \varepsilon_m) = \text{Ln}(\mu\varepsilon)_{R1} + [\text{Ln}(\mu\varepsilon)_{R2} - \text{Ln}(\mu\varepsilon)_{R1}]\left(\frac{\omega_m - \omega_{R1}}{\omega_{R2} - \omega_{R1}}\right) \qquad \text{Eq.[8]}$$

subscript R1 designates Reference Liquid 1
subscript R2 designates Reference Liquid 2
$\mu_m$=the viscosity of the liquid mixture
Step 9: Compute the specific volume of the mixture, including the solid and liquid components:

$$v_m = \sum_i m_i v_i \qquad \text{Eq.[9]}$$

$v_m$=specific volume of the liquid-solid mixture (cm$^3$/g)
$m_i$=mass fraction of component i
$v_i$=specific volume of component i (cm$^3$/g)
Step 10: Use the Einstein equation to account for the effect of dispersed solid particles on the effective viscosity of the liquid-solid mixture:

$$\mu_{\mathit{eff}} = \mu_m\left(1 + \frac{5}{2}\phi\right) \qquad \text{Eq.[10]}$$

$$\phi = \frac{m_S v_S}{v_m}$$

$\mu_{\mathit{eff}}$=effective viscosity of the liquid-solid mixture
$\mu_m$=viscosity of the liquid mixture
$\phi$=volume fraction of the solid particles
$m_s$=mass fraction of the solid particles
$v_s$=specific volume of the solid particles
$v_m$=specific volume of the liquid-solid mixture The Einstein equation is valid for mixtures containing spherical particles with a solid volume fraction ($\phi$ up to 0.05). Because silver is so dense compared to liquids, the $\phi$ value is low in all the mixtures of this experiment. For the 12%, 23%, 27% silver mixtures, the $\phi$ values are 0.0134, 0.0296 and 0.0356, respectively; so the Einstein equation is applicable.

The foregoing assumes the particles are spherical, as would be expected for particles of such small size in a paste. However, even if they were rod shaped with a 7:1 aspect ratio, the resultant change in viscosity would be nearly the same as predicted by the Einstein equation. The Krieger-Dougherty Equation for rod-like particles would change the $1+(5/2)\phi$ in the Eq.[10] to $(1-\phi)^{-1.4212}$. This would increase their effective viscosity in the 12, 23 and 27% silver ink by 1.88, 4.56 and 5.88% respectively.

Using the values from Tables 1-4, Steps 1-10 were executed. The results are shown in FIG. 1.

The viscosity values at 22 C in FIG. 1 correlate well with the measured values at laboratory ambient. The plot also verifies that the 23% formulation should have higher viscosity than the 27% formulation, as it indeed does.

Figure 2:
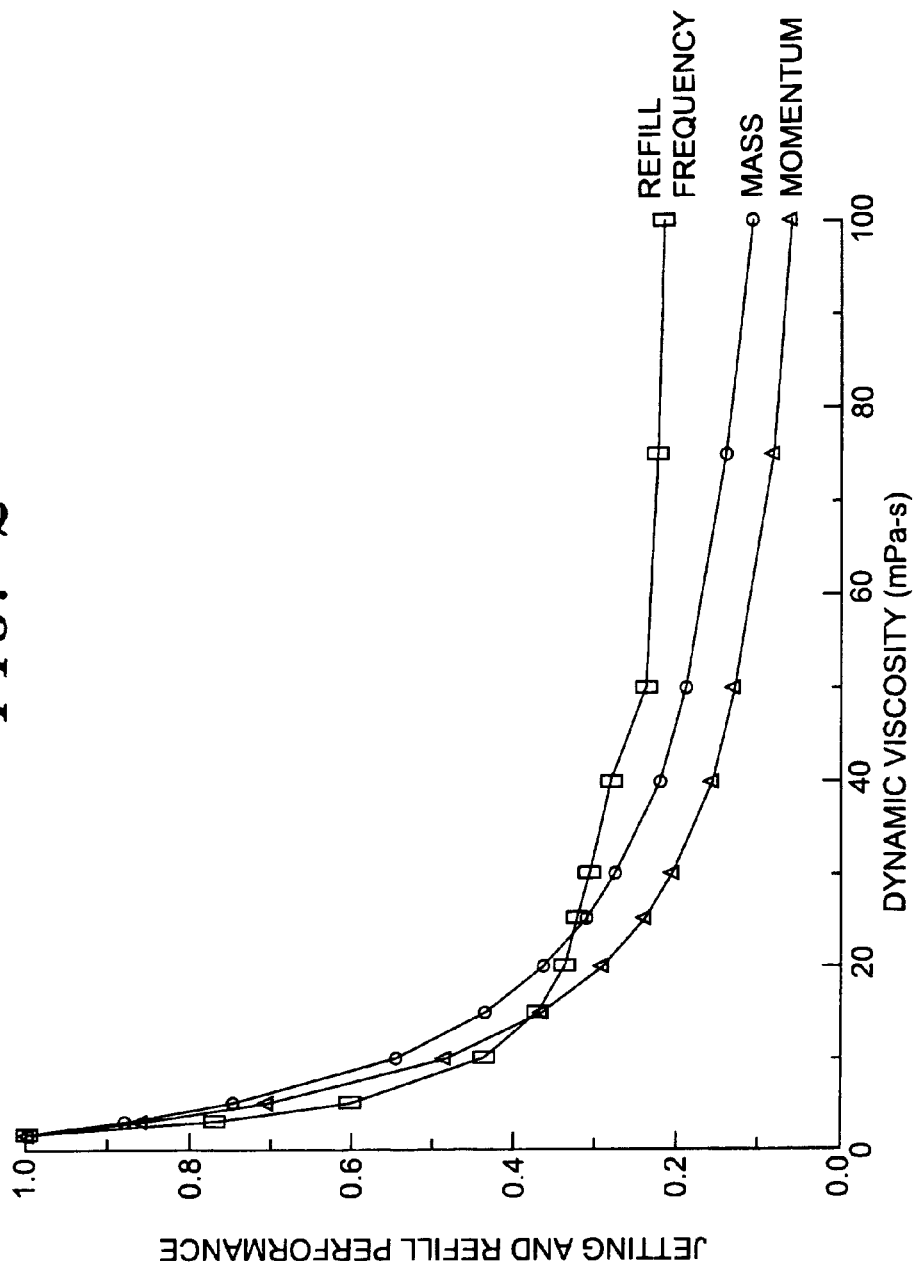
FIG. 2 illustrates the known relationship of dynamic viscosity versus jetting and refill performance.

The foregoing details why the formulations led to low viscosity, silver inks. FIG. 2 illustrates why viscosity is so important in a thermal ink jet ejector. For a typical thermal ink jet ejector, as viscosity increases the jetting and refill performance will degrade exponentially. This plot illustrates the motivation to formulate silver inks with low viscosity, preferably less than 10 mPa-s, more preferably less than 3 mPa-s.

US 2003/0185971, published Oct. 2, 2003, of Saka et al teaches conductive ink formulations limited to 10% solids. It makes no mention of formulations to achieve low viscosity. Since this invention teaches silver loading significantly higher than 10%, and it also teaches low viscosity formulations, the art of thermal inkjet printing is significantly advanced.

Section-II: Nucleation Effects

Figure 4:
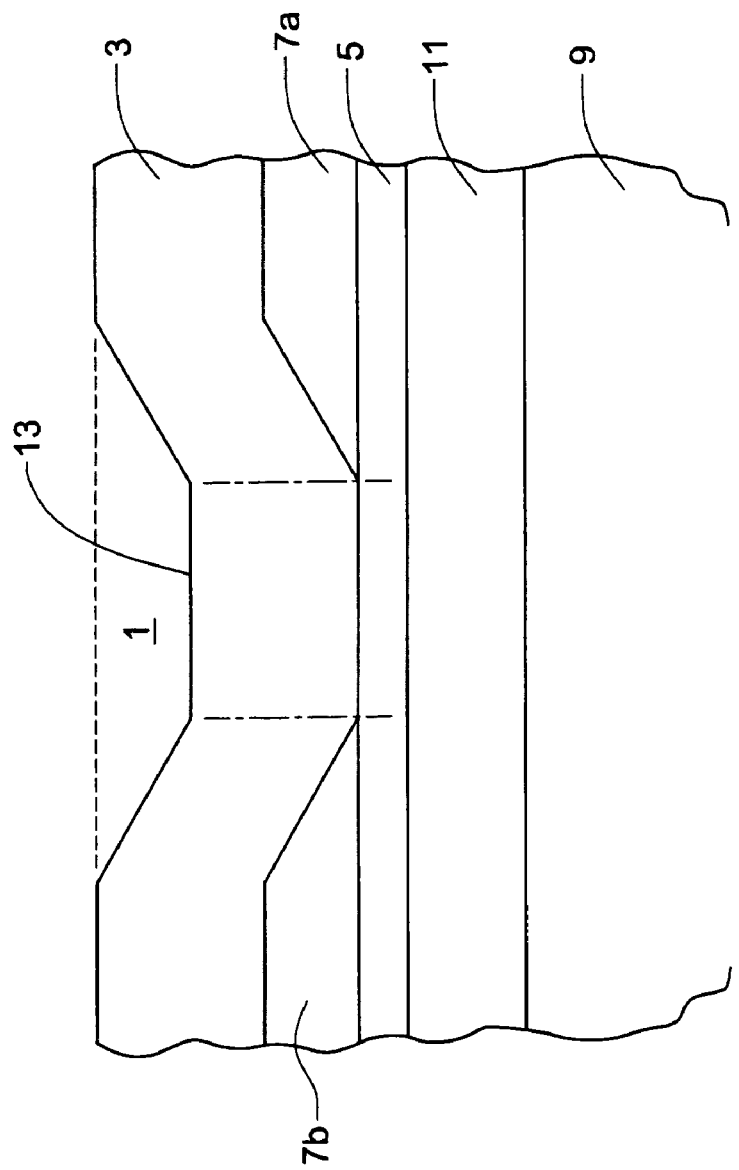
FIG. 4 broadly illustrates a thermal heater employing this invention.

FIG. 4 broadly illustrates a conventional thermal heater with which this invention may be employed. Ink 1 is held in a region defined by overcoat 3. Under overcoat 3 is electrical resistor 5. A nozzle immediately over ink I is not shown. Conductors 7a, 7b contact resistor 5 to form a heating region by electric current from of conductors 7a, 7b being directed into resistor 5.

The heater is formed and supported on silicon substrate 9, and a thermal barrier layer 11 separates resistor 5 from the silicon substrate 9. The single heater of FIG. 4 is replicated many times on a single chip.

The heater stack as the term is used in this specification is illustrated by alternating dashes and dots in FIG. 4. The heating region of resistor 5 forms one side of the heater stack. The surface 13 to which the heating region is generally coextensive form the other side of the heater stack. That part of overcoat 3 which is generally coextensive with surface 13 forms the remainder of the heater stack. FIG. 4 shows a cross section. The elements shown extend perpendicular to those illustrated to form a surface 13 having an area and a depth as shown defining a corresponding volume of the heater stack. The surface 13 is typically square, but may be round or some other shape.

Overcoat 3 is of material protective of resistor 5. Typically, overcoat 3 is two or more layers selected for good thermal conductivity and ability to protect resistor 5 over the expected life of the heater. A typical material of resistor 5 is tantalum-aluminum or tantalum-nitride. A typical material of protective overcoat 3 is tantalum or silicon nitride.

FIG. 4 illustrates the nucleation response for the three silver inks of this experiment. Also plotted is the nucleation response of deionized water. Note that the silver ink formulations have a nucleation response identical to water.

Figure 3:
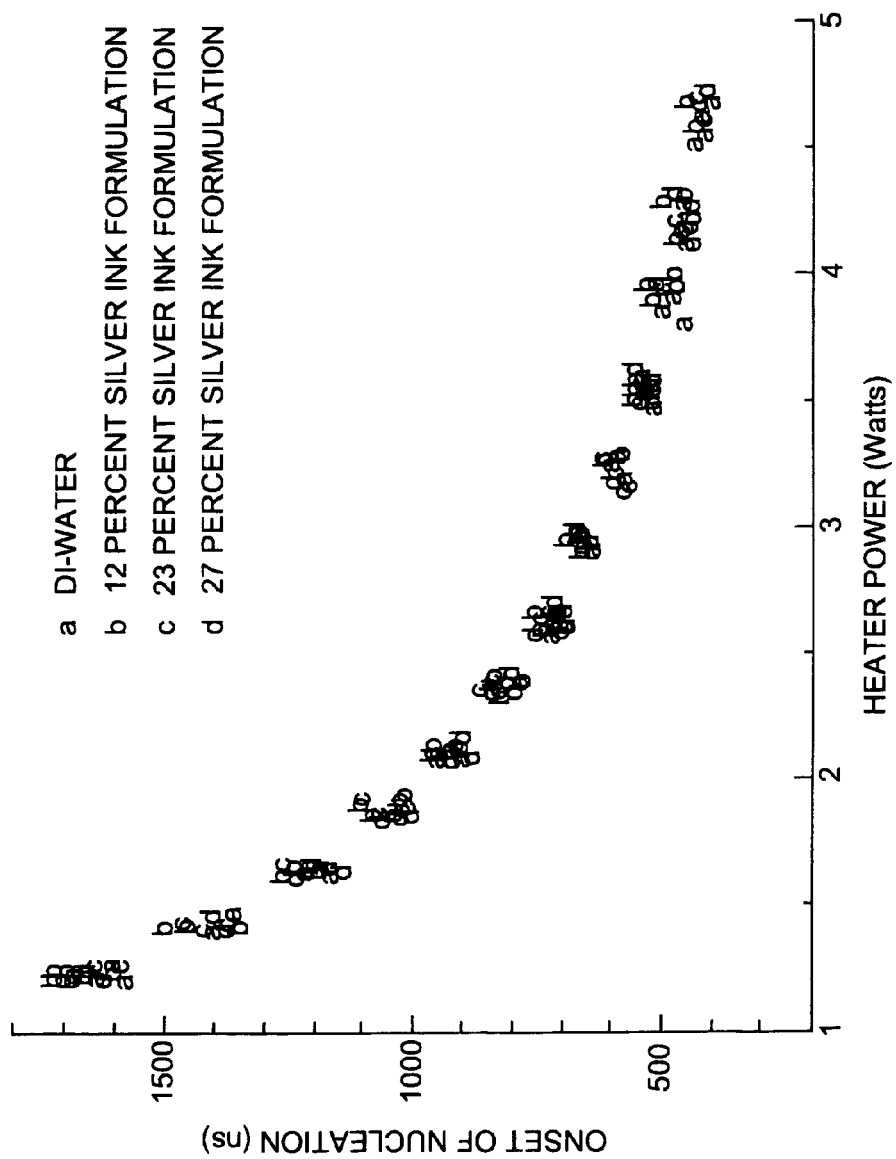
FIG. 3 illustrates the heater power versus onset of nucleation for the experimental inks of Table 1-4.
Figure 5:
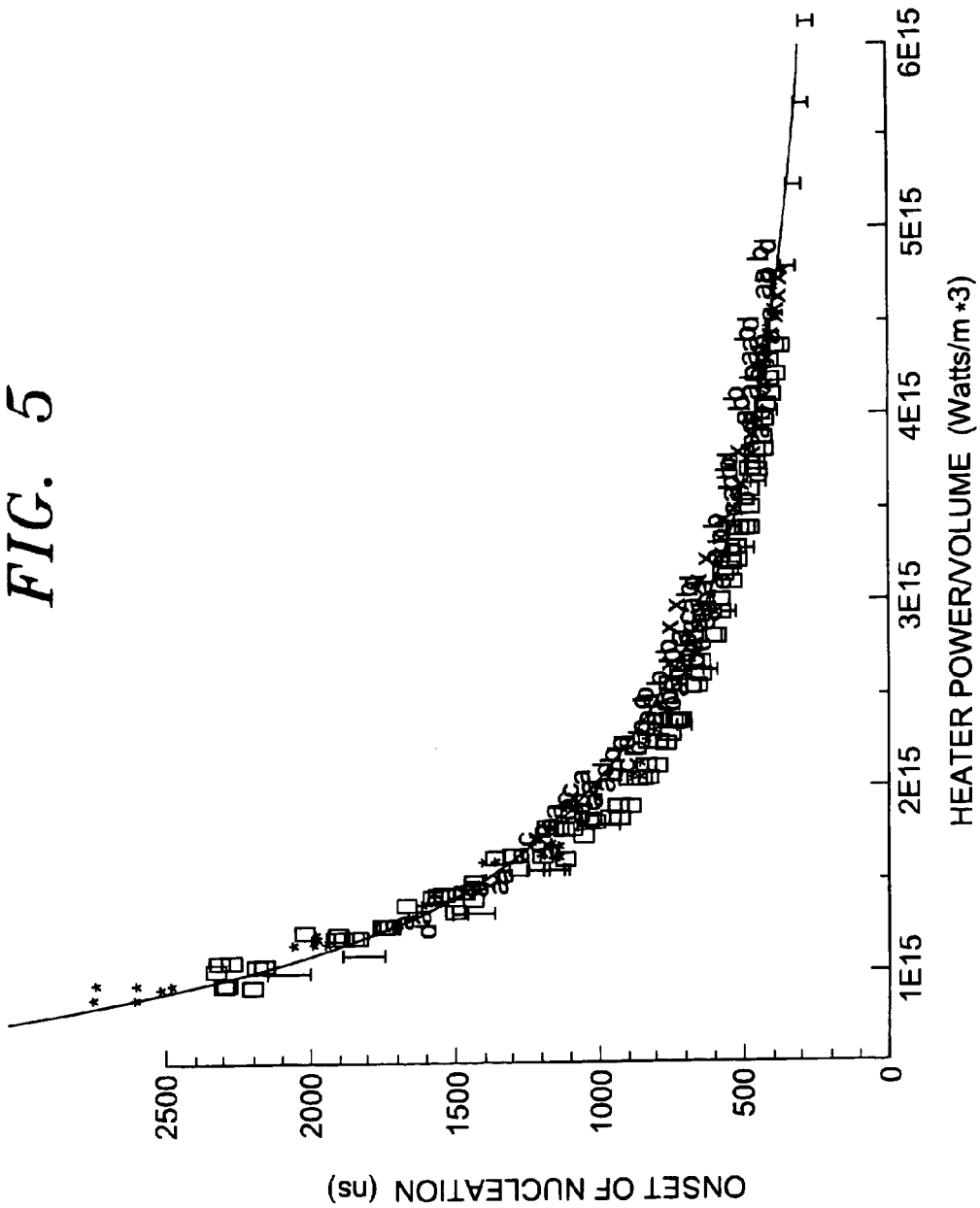
FIG. 5 illustrates the common nucleation response for the experimental inks of Tables 1-4 along with dye and pigment inks across a wide variety of heater shapes, sizes and heater materials.

An earlier study, (see the foregoing U.S. Pat. No. 6,575,563) showed a common nucleation response for all heater shapes, sizes and all thin-film materials that obey the Law of Dulong and Petit; and for all aqueous inks with pigment, or dye colorants. The unexpected results of FIG. 3 imply that silver inks may be included in the common nucleation response as well. FIG. 5 verifies that this is the case. In FIG. 5, the data from FIG. 3 is combined with other data sets that included a variety of heater sizes, shapes, thin film materials and dye/pigment inks. When the nucleation onset for all these experiments is plotted against power per unit heater volume, the common response reveals itself. As noted in the cited prior art, power per unit volume is described as in Eq.[11a].

$$P_{VOL} = \frac{I_{HTR}^2 R_{HTR}}{A_{HTR}(thk_R + thk_{OC})} \quad \text{Eq. [11a]}$$

$P_{VOL}$=power per unit heater volume (Watts/m$^3$)
$I_{HTR}$=heater current (Amperes)
$R_{HTR}$=heater resistance (Ohms)
$A_{HTR}$=area of the resistor (m$^2$)
$thk_R$=thickness of the resistor (m)
$thk_{OC}$=total thickness of the overcoats (m)

The generic nucleation response of FIG. 5 is described by the following regression equation based upon the experimental results across a wide variety of inks (including the silver inks of Section-I) heater shapes, sizes and thin film stacks:

$$t^* \cong 6.963 \times 10^{19}(P_{VOL})^{-1.1006} \quad \text{Eq.[11b]}$$

$t^*$=nucleation onset (nanoseconds)
$P_{VOL}$=power per unit heater volume (Watts/m$^3$)

The solid black curve passing through the data set in FIG. 5 is the regression equation.

Note that FIG. 5 also includes the simulation results, noted by the vertical bars. It was an unexpected discovery that heavily loaded silver inks would obey the nucleation response taught in the foregoing U.S. Pat. No. 6,575,563.

However, with a theoretical analysis we may explain these results: thus adding the nucleation kinetics of the silver inks described in Section-I to the body of thermal inkjet knowledge.

Nucleation Kinetics

Consider that the nucleation event occurs only in the liquid. Accordingly, in other words, the liquid-vapor phase change does not involve the solid particles. Since silver has a boiling point of 2162 C, this is a logical statement. Thus after removing the silver molar component from the mixtures in Tables 1-3, we are left with 4.03, 3.28 and 3.53 liquid moles per 100 grams of liquid in the 12%, 23%, and 27% formulations, respectively. Of the liquid moles in these mixtures, the water component takes up 3.83, 3.05 and 3.43 moles, respectively. So for the 12%, 23% and 27% silver ink formulations, the water mole fractions are 0.95, 0.93 and 0.97, respectively. Since the liquid-vapor phase change is an event that involves molecular kinetics of the liquid, and more than 90% of the liquid molecules in these formulations are H$_2$O; it follows that the heavily loaded silver inks should indeed have a nucleation response identical, or nearly identical, to water.

The theoretical analysis that follows is not intended to render the experimental discoveries as obvious. Rather the intent of including the underlying theory is to deepen the extent of the information included in the disclosure. By showing the empirical-theoretical linkage, this specification intends to show that these experimental discoveries are not special cases. Because the theoretical results map into FIG. 5, they too represent the general case, and therefore have universal applicability that extends beyond the bounds of this particular experiment.

As detailed in by Robert Cornell, one of the inventors of this application in a paper delivered in 1996 entitled *A Theoretical and Experimental Examination of Thermal Ink Jet Nucleation Criteria*, IS&T-NIP12: Int. Conf. Digital Printing Tech., the nucleation response is computed by a solution of the following set of equations:

$$\frac{\partial}{\partial x}\left(K_x \frac{\partial T}{\partial x}\right) + \frac{\partial}{\partial y}\left(K_y \frac{\partial T}{\partial y}\right) + \frac{\partial}{\partial z}\left(K_z \frac{\partial T}{\partial z}\right) + Q = \rho C_P \frac{\partial T}{\partial t} \quad \text{Eq. [12]}$$

$$J_{ho} = 1.44 \times 10^{40}\left(\frac{\rho_L^2 \sigma}{M^3}\right)^{1/2} \exp\left[\frac{-1.2137 \times 10^{24} \sigma^3}{T(\eta P_{SAT} - P_L)^2}\right] \quad \text{Eq. [13a]}$$

$$\eta = \exp\left[\frac{P_L - P_{SAT}}{\rho_L \left(\frac{R_G}{M}\right) T}\right] \quad \text{Eq. [13b]}$$

$$\lambda = \int_{Vol} J[T(x, y, z, t)] dVol \quad \text{Eq. [14]}$$

$$P_{HO} = 1 - \exp\left[-\int_0^{t_p} \lambda dt\right] \quad \text{Eq. [15]}$$

$P_{HO}$=probability of liquid-vapor nucleation (dimensionless number ranging from 0 to 1)
T=temperature (K)
Q=Joule heating function (W/m$^3$)
$K_{xyz}$=thermal conductivity (W/m-K)
$\rho$=density (kg/m$^3$)
$\rho_L$=liquid density (kg/m$^3$)
$C_P$=specific heat (J/kg-K)
$J_{HO}$=volumetric nucleation rate (vapor molecules/s/m$^3$)
$P_{SAT}$=saturated vapor pressure (Pa)
$P_L$=liquid pressure (Pa)
M=molar weight of the liquid (kg/kg-mol)

$R_G$=universal gas constant=8314 J/kg-mol/K
σ=surface tension (N/m)
t=time (s)
tp=pulse time (s)
Vol=volume of the thermal boundary layer in the ink (m³)

Since most of the liquid molecules in the silver ink formulations consist of $H_2O$, the property values for water are used in this analysis. This is more than a mathematical convenience. Note that the nucleation rate equation (Eq. [13a]) is heavily dependent on surface tension. Yet, no experimental evidence has been found or is known by the inventors of the specification that the onset of nucleation (for aqueous ink) correlates with surface tension. However, that only means that there's no relationship to surface tension values as they are commonly measured—as will be explained. This σ independence anomaly was found to be true in the experiments of this specification (FIGS. 3-5), as well as those described in the foregoing 1996 paper by Robert Cornell, the foregoing U.S. Pat. No. 6,132,030 and the foregoing U.S. Pat. No. 6,575,563. So in all of the experiments with silver inks, dye inks, pigment inks and ordinary water; the carefully measured nucleation response did not depend on the measured values of surface tension—let alone $\sigma^3$. In these experiments, the measured surface tension varied over a range of 2.5:1, yet no σ(or $\sigma^3$) dependence emerged from the experimental nucleation data. This anomaly is explained as follows: Surface tension, as commonly measured, is obtained on a macroscopic time scale. It takes a finite amount of time for surface modifying agents to migrate to the liquid-gas interface. During the macroscopic time scale of typical surface tension measurements, there is enough time for such migration. However, consider that the heating rates involved in thermal inkjet nucleation exceed 300 million degrees Kelvin per second, and in many cases they approach 1 billion degrees Kelvin per second. So on the rapid time scale of the explosive nucleation event inside a thermal inkjet device, the surface energy required to form the liquid-vapor interface is dictated by the bulk liquid—water. This fact is confirmed in that all the data (water, silver inks, dye ink and pigment ink) follows a common nucleation response—indicating that using the σ(T) values of water in Eq.[13a] is indeed appropriate. Furthermore, surface tension values resulting from typical, macroscopic surface tension measurements are quite inappropriate for use in the nucleation rate equation because they would indicate a significant lowering of the superheat limit. This would manifest itself as a significant lowering of the nucleation time—which the inventors do not see in any of the lab data included in this specification, the foregoing 1996 paper by Robert Cornell, the foregoing U.S. Pat. No. 6,132,030 and the foregoing U.S. Pat. No. 6,575,563.

The simulation results shown in FIG. 5 come from a finite element solution of Eq.[12-15]. The σ(T) values come from *Principles of Heat Transfer*, by F. Kreith, and M. S. Bohn, Harper & Row, 4th Edition, (1986) and the $P_{SAT}$(T) values come from *Fundamentals of Classical Thermodynamics*, by G. S. Van Wylen and R. E. Sonntag, John Wiley & Sons, 2nd edition (1972). The simulation results are represented as bars. The reason for this is the nucleation event does not occur instantaneously across the entire heater surface. There exists a temperature gradient across the heater surface. The further away from the heater center—the longer it takes to satisfy Eq.[15]; thus the bars in FIG. 5.

The numerical solution of Eq.[12-15] indicates that the onset of nucleation occurs when the ink-heater interface reaches a temperature of 323 C. Consider that the saturated vapor pressure corresponding to this temperature is 116 atmospheres. Under such an explosive pressure pulse, the vapor embryos expand quickly. With low power per unit volume (<1.5×10¹⁵ W/m³), the heating rate at the ink-heater interface is low. Under such pulse conditions, when the vapor embryo rapidly expands into a cooler, neighboring region, it is not hot enough to sustain nucleation at the superheat limit. So it will begin to contract. Yet if in the next instant of time the probability of nucleation (Eq.[15]) goes to unity in that neighboring region, nucleation will begin again. Such expand-contract-expand behavior induces ragged bubble formation and nucleation induced velocity variations. It has been found that applying power per unit volume greater than 1.5×10¹⁵ Watts/m³ to the heater stack minimizes such nucleation induced velocity variations. This corresponds to an onset of nucleation in less than, or equal to, 1400 nanoseconds. This was determined, and claimed in the foregoing U.S. Pat. No. 6,575,563. This disclosure seeks to extend those claims to include the silver ink formulations described in Section-I.

Section-III: Heater Energy

When a common response is found versus input power, a common response exists versus input energy. The knee of the jetting curve is in the vicinity of 2.9×10⁹ Joules/m³.

Figure 6:
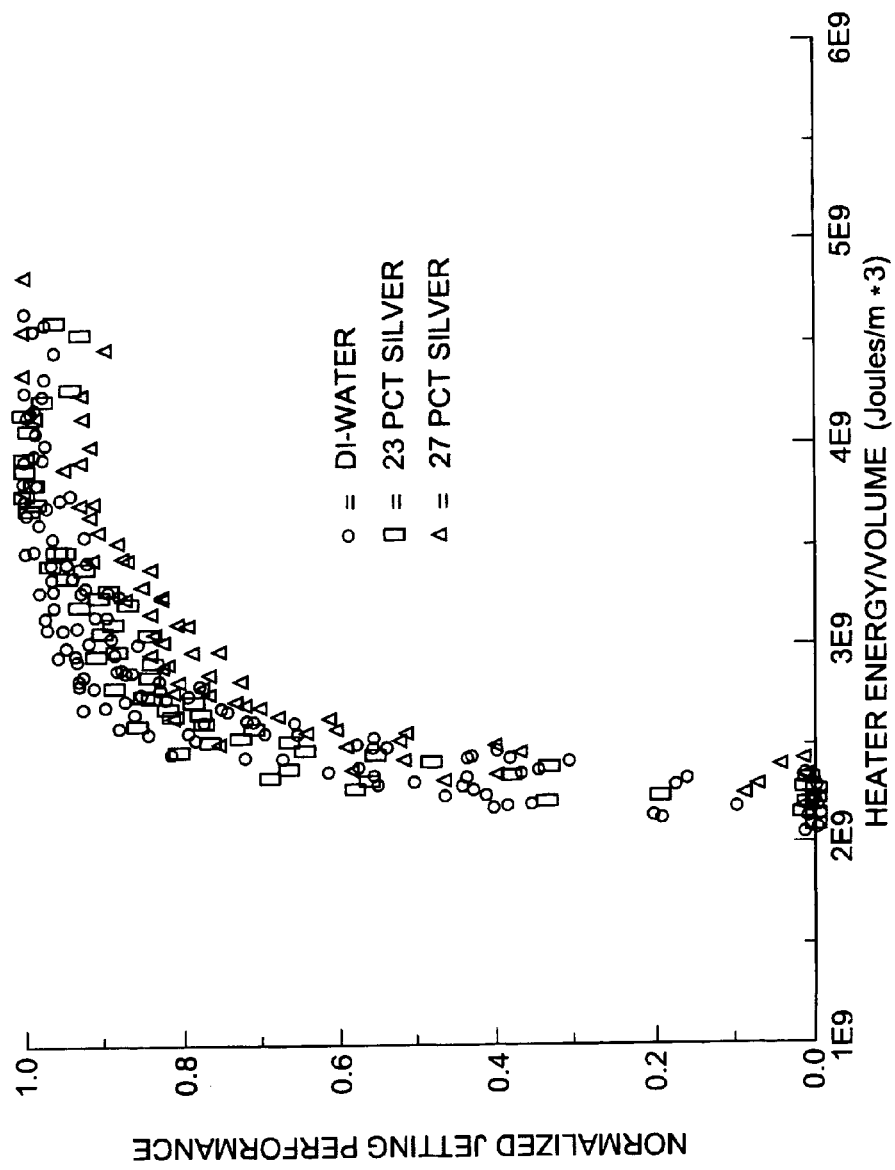
FIG. 6 illustrates the jetting response versus energy for the experimental inks of Tables 1-4 along with water.

This invention includes the discovery that the silver inks follow this general rule as well. FIG. 6 illustrates the jetting response versus input energy for the silver inks and deionized water of the experiments described in Sections I-II. Note that the knee of the curve is indeed in the vicinity of 2.9 GJ/m³.

Energy at the heater may be computed as follows:

$$E_{VOL} = \frac{\int_0^{tp} I_{HTR}^2 R_{HTR} \, dt}{A_{HTR}(thk_R + thk_{OC})} \quad \text{Eq. [16]}$$

$E_{VOL}$=energy per unit heater volume (Joules/m³)
$I_{HTR}$=heater current (Amperes)
$R_{HTR}$=heater resistance (Ohms)
$A_{HTR}$=area of the resistor (m²)
$thk_R$=thickness of the resistor (m)
$thk_{OC}$=total thickness of the overcoats (m)
t=time (s)
tp=pulse time (s)

OTHER EMBODIMENTS AND SUMMARY

As the foregoing establishes, aqueous inkjet inks having metal for printing of conductive patterns or for other reasons can be printed employing heat energy within the range of current printers. In embodiments the particles would be about 132 nm or less in diameter to avoid excessive settling. For optimum printing the energy delivered would be about 2.9×10⁹ Joules/m³ or larger of volume of the heater stack, preferably not much larger so as to conserve energy. In embodiments the mole fraction of water in the ink would be greater than 0.9 computed with respect to only the liquid components of the ink and the ink would be heated by contact with the surface a heater heated to 1.5×10¹⁵ or more watts/m³ of volume of the heater stack. Embodiments of a silver ink will have greater than 12% silver and up to 27% silver by weight of the weight of the ink; the ink may have a viscosity of less than 3 Pa-s at 22 degrees C., preferably is less than 2.7 mPa-s; the ink may have a mole fraction of water greater than 0.87, preferably greater than 0.9, this mole fraction being computed with respect to all of the components of the ink. The silver particles are preferably of size between about 20 nm and 30 nm for enhanced print resolution and reduced settling.

It should be understood however, that some settling may be tolerable as the printing of metal particles is often done in a controlled environment, such as a factory, where the ink can be readily stirred or settling otherwise reversed.

The potential for alternatives and variations consistent with the foregoing will be readily apparent.

ADDENDUM

Paste Technical Description

This invention employs the chemical reduction in an aqueous medium of a metal salt to the elementary metal colloid in the presence of a polymeric dispersant for the elementary metal colloid. The polymeric dispersants have ionic hydrophilic segments and nonionic hydrophilic segments. Such a dispersion is employed in aqueous inkjet inks having standard ingredients, particularly a humectant to reduce evaporation. The inks when printed on a ceramic substrate leave silver which is sintered by heat to a solid, conductive pattern.

The polymeric dispersant may be somewhat made like dispersants which have been developed in recent years for the pigmented inks in inkjet. But there are also some fundamental differences. It is preferred that the dispersant is an acrylic polymer contains at least two major components: anionic segments and non-ionic segments. The anionic segments contains monomer having the carboxylic acid or sulfonic acid functional groups, which provides the electrostatic stability of the dispersion. The acid groups also provide the ability of interaction between silver and the polymer. The non-ionic segments are chosen from the hydroxy terminated polyethylene glycol monomers. It not only provides the steric stabilization, the hydrogen bonding interaction with the silver, but also give the solubility of the dispersion in the water/organic solvent therefore provides the ink printing reliability. It is also preferred that the PEG monomer has a molecular weight lower than 1000.

The polymer is a random co- or ter-polymer made through free radical polymerization. The molecular weight is controlled by a chain transfer reagent. Any kind of merchant compound can be used as the chain transfer reagent. Preferred chain transfer reagent in this reaction contains the hydroxy or acid functionality, such as 2-mercaptoethanol, 3-mercaptoethanol, mercaptoacetic acid, mercaptopropionic acid. 3-mercapto-1,2-propanediol.

The carboxylic acid content is very important in the dispersion. Too less will not provide the stability of the colloid preferred. Too much will also not compatible with the silver salt and result in large metal particle formation. The actual content can be judged in the reduction. Less than 50 wt % of acid is preferred, less than 20% of acid is more preferred.

The molecular weight is a not very important factor, and can be judged by the art in the term of dispersant and ink jet printing reliability. Too high molecular weight will increase the viscosity of the ink. But too low will not provide the stability of the dispersion also. Preferable from 8000 to 1000 by weight average molecular weight.

The reducing reagent used here is hydrazine. According to the general equation: $4Ag^+ + N_2H_4 \ldots \rightarrow 4Ag + N_2 + 4H^+$ (J. Appl. Polym. Sci. 1992, Vol. 44, pages 1003-1007 and Langmuir 2000, 16, pages 9087-9091) the reaction is very simple and can be completed at room temperature. The bi-product is a gas, which made the final product easy to be purified. Because of the existence of the stabilizer, the concentration of the silver can also be adjusted in the process.

It is believed the particle size of the silver colloid is controlled by several factors.

First is the dispersant. The acid functions to interact and stabilize the silver colloid. But the quantity of the acid groups directly influence the solubility of the silver salt, and the solubility of the silver salt affects the particle size. The best quantity of the acid is that it will form a clear solution with the silver nitrate. If the clouds form, the particle size of the silver will be higher than expected. Second is the process. This reaction's bi-product is a gas. It generates foam in the reaction. Therefore, control the stirring speed, the addition speed and the ratio of the silver salt and the hydrazine is very important. It is preferred that the silver salt/dispersant solution and the hydrazine be dropped simultaneously to a dispersant solution. The dropping speed is silver salt faster than hydrazine. The last thing is the amount of the dispersant. Although it looked like the quantity of the dispersant is not very important in the particle size formation period, to maintain its stability through out the shelf life. Preferred ratio of dispersant to silver nitrate is 0.1 to 1 to 0.6 to 1 by weight. Most preferred is 0.2 to 1 by weight.

Some commercial polymers have the ability to disperse the silver colloid particles, such as polyacrylic acid. But, to reach the required particle size, the concentration, the required storage stability and the thermal ink print head reliability, this embodiment employs selected the monomer for this unique purpose. Generally speaking, a homopolymer of polyacrylic acid (PAA) produces larger size of silver colloid particles compared with co-polymer of this invention. The stability and printing reliability are also not as expected as the co-polymer. But it can be used as a co-stabilizer in the reaction system, its acid functionality can provide the buffer ability to the reaction system.

As illustrative of this invention, the random co-polymer of methacrylic acid and polyethylene glycol methacrylate (MAA/PEGMA); and co-polymer of MAA/Tris (polyethyleneglycol)2,4,6-tris 1-phenyl ethyl phenyl ether methacrylate), are used here. Hydrazine monohydrate is used as the reducing agent.

The General Methods of Synthesis of the Co-polymers are as Follows:

A mixture of polyethylene glycol methacrylate (mw360) 54 g and methacrylic acid 13 g, 3-mercapto-1,2-propanediol 3.6 g, iso-propanol 100 ml and V-601(dimethyl 2,2'-azobisisobutyrate) 0.2 g is mixed in a 300 ml three neck round bottom flask equipped with a mechanical stir, condenser and thermometer. The flask equipment is de-gassed, back filled with nitrogen and then heated to 75 C in an oil bath for 18 hours. The solvent is then removed by evaporation and the mixture is neutralized with 20% KOH solution in De-ionized water. Final pH is 7.0.

The Reduction is Carried Out in the Following Methods:
  1. Using Polymer Dispersant A
In a 200 ml flask, 50 ml of DI water and 0.2 g pure dispersant is mixed.
  Prepare separately
1) 1 g silver nitrate in 5.0 ml DI water and 0.2 g dispersant. (assure it is a clear solution)
2) 0.4 g hydrazinemonohydrate (98%) in 50 ml DI water.

Dropping 1 and 2 solution at the same time to the flask with good stirring. The dropping speed of silver nitrate is slightly faster than the hydrazine. Assure there is no foaming of the reaction. After addition of the silver nitrate, dropping of the hydrazine is continued while testing the completion of the reduction by using the ascorbic acid sodium salt solution until no black precipitate will be generated. At the point that the mixture does not generate black precipitate with the ascorbic acid, addition of the hydrazine solution can be stopped. The mixture is continued stirring for another hour, check the particle size by the MICROTRAC UPA 150 instrument. The particle size is about 16-25 nm. The final silver colloid is concentrated by ultra-filtration to the concentration of 10 to 30%.

2. Using polymer dispersant A and the method as described above, except the amount of polymer dispersant and the hydrazine are each ⅓ of the above; the particle size is 22 nm.

3. Using polymer dispersant A and the method as described in 1) above, except the amount of the hydrazine is increased ⅓ to about 0.53 g; the particle size is 24 nm.

4. In a 200 ml flask, 50 ml of DI water, 0.1 g of PAA sodium salt and 0.13 g pure dispersant is mixed.

Prepare Separately 3) 1 g silver nitrate in 50 ml DI water and 0.13 g dispersant. (assure it is a clear solution)

4) 0.4 g hydrazinemonohydrate (98%) in 50 ml DI water.

Dropping 1 and 2 solution at the same time to the flask with good stirring. The dropping speed of silver nitrate is slightly faster than the hydrazine. Assure there is no foaming of the reaction. After addition of the silver nitrate, dropping of the hydrazine is continued while testing the completion of the reduction by using the ascorbic acid sodium salt solution. At the end of the reaction the mixture does not generate black precipitate with the ascorbic acid. The mixture is continued stirring for another hour, check the particle size by the MICROTRAC UPA 150 instrument. The particle size is about 20-30 nm. The final silver colloid is concentrated by ultra-filtration to the concentration of 10 to 30%. (The PAA Mw can be from 1000 to 15,000. Prefer about 5000 to 8000)

Similar polymer solutions are made by the same method with the following formulation

|  | A | B | C | D | E | F | G |
|---|---|---|---|---|---|---|---|
| PEGMA(360) |  | 54 | 43 |  | 25 | 43 | 54 |
| PEGMA(526) |  |  |  | 25 |  |  |  |
| Tris |  |  |  |  |  | 50 |  |
| MAA | 13 | 21 | 43 | 43 | 21 | 25 | 8 |
| 3-mercapto-1,2propandiol | 3.6 | 3 | 2 | 2 | 1.5 | 1.1 | 2.8 |
| Particle Size(nm) | 15–25 | 28 | 106 | 245 | 125 | * | 29 |

* high viscosity

An illustrative ink formulation used for printing is as follows: The particle size of the silver is preferred between 10 to 30 nm.

68 g of the silver colloid dispersion made from polymer dispersant A 4.3 g glycerol 4.3 g 2-pyrrolidone 0.2 g SURFYNOL 465 (an acetylene surfactant from Air Product) Silver content of this ink is 13.5% by Inductive Coupled Plasma (ICP) measurement. Particle size 16 nm; viscosity 2.2 cp; pH is adjusted with a base to 6.0.

Printing may be on the coated surface of commercially available papers for inkjet printing. These papers typically have gelatin or porous ceramic coating to receive ink. The sintering temperatures do not destroy these paper so the resulting paper is suitable as an electrical element to be covered in a limitation [in original, should read "lamination"] or otherwise encased.

Printing with this illustrative ink on a water absorptive substrate, followed by sintering under heat, produced electrical conductive patterns. Process can be variable, include print pass (i.e., how many 600 dpi layers are laid on the media), print mode (full density vs. shingling mode), sinter temperature and sinter time. For full density print pattern, 600 dpi ink drop will be laid down after one swath. For shingling print pattern, it needs two repeat swathes to get 600 dpi ink drop density. The result indicates that the best performance of the described ink has a sheet resistance 0.16 $\Omega$/[in original, should read $\Omega$/square].

Although described with specific embodiment of silver, other metals can similarly be reduced and therefore the invention extends to metals in general.

What is claimed is:

1. The method of printing an aqueous inkjet ink by thermal inkjet printing from a heater having a surface which contacts ink to be expelled by heat, said heater having a heater stack volume defined by a volume of a heating material generally coextensive with said surface, plus a volume of heat-conductive protective material generally coextensive with said surface occupying substantially all of a region between said heating material and said surface, said ink having silver metal particles about 132 nm or less in diameter, comprising delivering to said heater stack about $2.9 \times 10^9$ Joules/m$^3$ or larger of volume of said heater stack, wherein said silver particles are in the range of 12% by weight to about 27% by weight of the weight of said ink, said ink having viscosity of less than 3 mPa-s at 22 degrees C., and wherein said ink has greater than 0.9 mole fraction of water computed only with respect to the liquid components of said ink.

2. The method as in claim 1 in which said silver particles have a diameter of in the range of about 20 nm and 30 nm.

3. The method of printing an aqueous inkjet ink in contact with the surface of a heater by thermal inkjet printing, said ink having silver particles about 132 nm or less in diameter, said heater having a heater stack volume defined by a volume of a heating material generally coextensive with said surface, plus a volume of heat-conductive protective material generally coextensive with said surface occupying substantially all of a region between said heating material and said surface, comprising heating said ink with $1.5 \times 10^{15}$ watts/m$^3$ or higher of volume of said heater stack, wherein said silver particles are in the range of 12% by weight to about 27% by weight of the weight of said ink, said ink having viscosity of less than 3 mPa-s at 22 degrees C., and wherein said ink has greater than 0.9 mole fraction of water computed only with respect to the liquid components of said ink.

4. The method as in claim 3 in which said silver particles have a diameter of in the range of about 20 nm and 30 nm.

5. The method of printing an aqueous inkjet said ink having silver particles of about 132 nm or less in diameter in amount in the range of 12% by weight to about 27% by weight of the weight of said ink, and said ink having viscosity of less than 3 mPa-s at 22 degrees C. comprising printing said ink by thermal inkjet printing, wherein said ink has greater than 0.9 mole fraction of water computed only with respect to the liquid components of said ink.

6. The method as in claim 5 in which said viscosity is less than 2.7 mPa-s.

7. The method as in claim 5 in which said silver particles have a diameter in the range of about 20 nm to 30 nm.

8. The method as in claim 6 in which said silver particles have a diameter in the range of about 20 nm to 30 nm.

9. The method of printing an aqueous inkjet said ink having silver particles of about 132 nm or less in diameter in amount in the range of 12% by weight to about 27% by weight of the weight of said ink, said ink having viscosity of less than 3 mPa-s at 22 degrees C., and said ink having mole fraction of water greater than 0.87, said mole fraction being computed with respect to all of the components of said ink comprising printing said ink by thermal inkjet printing.

10. The method as in claim 9 in which said silver particles have a diameter in the range of about 20 nm to 30 nm.

11. The method as in claim 9 in which said mole fraction of water is greater than 0.9.

12. The method as in claim 10 in which said mole fraction of water is greater than 0.9.

* * * * *